(12) United States Patent
Anaya

(10) Patent No.: US 8,913,304 B2
(45) Date of Patent: Dec. 16, 2014

(54) METHOD OF COPYING AND SCANNING DOCUMENT

(76) Inventor: Reynaldo Anaya, Placentia, CA (US)

( * ) Notice: Subject to any disclaimer, the term of this patent is extended or adjusted under 35 U.S.C. 154(b) by 379 days.

(21) Appl. No.: 13/485,716

(22) Filed: May 31, 2012

(65) Prior Publication Data

US 2013/0321878 A1   Dec. 5, 2013

(51) Int. Cl.
*H04N 1/04* (2006.01)
*G03G 15/00* (2006.01)

(52) U.S. Cl.
USPC .......................... 358/474; 358/497; 399/380

(58) Field of Classification Search
CPC ......... H04N 1/04; H04N 1/10; H04N 1/0461; H04N 1/00567
See application file for complete search history.

(56) References Cited

U.S. PATENT DOCUMENTS

| | | | |
|---|---|---|---|
| 7,106,477 B2 * | 9/2006 | Horobin | 358/1.9 |
| 2003/0072039 A1 * | 4/2003 | Liu et al. | 358/474 |
| 2006/0077477 A1 * | 4/2006 | Peng | 358/474 |
| 2011/0122455 A1 * | 5/2011 | Elliot et al. | 358/406 |
| 2011/0181920 A1 * | 7/2011 | Kim | 358/474 |

* cited by examiner

*Primary Examiner* — Fred Guillermety
*Assistant Examiner* — Henok A Shiferaw
(74) *Attorney, Agent, or Firm* — Raymond Y. Chan; David and Raymond Patent Firm

(57) ABSTRACT

A method of reproducing an original document with a reproduction machine to produce a copied document, comprising the steps of: providing a marking member which contains a marking onto the reproduction machine; opening a cover unit of the reproduction machine; placing the original document on a glass surface of a glass unit of the reproduction machine; closing the cover unit so that the glass surface is covered by the cover unit; and pressing a start button of the reproduction machine to start a scanning process such that the marking and the original document are scanned together in the scanning process and are appeared in the copied document. The marking member is provided on the cover unit or the glass unit so as to make sure that the marking is well-positioned and copied in the copied document.

20 Claims, 6 Drawing Sheets

METHOD OF COPYING AND SCANNING DOCUMENT

BACKGROUND OF THE PRESENT INVENTION

1. Field of Invention

The present invention relates to a method of copying and scanning document, and more particularly to a method of copying or scanning document which is capable of providing guidance for adding a marking at a particular position of the resulting copied document.

2. Description of Related Arts

Copying and scanning are common office tasks which are usually done by junior office staff or sometimes by low-skilled labor. The steps involved includes opening a cover of a copier or scanner, placing a document onto a glass of the copier or scanner, then covering the cover or scanner and pressing a button for copying and scanning. The problem is there is no indicator or reminder from the copier or scanner for leaving a margin for binding. For example, important information such as reference number, date or the like may be removed or partially removed during hole-punching on a top side of the copied document. The problem may be curable if the original document is still in the procession of the user. However, most of the time, the copying and scanning work is done by junior office staff and the copied document is reviewed by senior staff some time later. Accordingly, this poses a great challenge to the management in securing a quality copy which contains all the information in the original paper.

In some organizations or government agencies, when making a copy or a scan copy of document, a particular marking is required. When a marking at a top end margin is required for copying identification documents, the person making the copy will have to manually adding the particular marking to the document for each particular document. When the only responsibility of the staff is making copy, it is easy to forget to add the marking. It is also difficult to standardize a particular position of the marking on the paper when it is done manually for each document. Sometimes, the marking may be positioned outside the printable area and is not copied or is partially copied onto the copied documents. Also, the problem of adding the marking onto the margin which may be hole-punched or removed may also occur. When the position of the marking is not standardized at a particular position, it is also possible that the marking has overlapped with the copying object or information on the document at the time of copying and therefore some information of the copied document is not viewable or is not shown clearly or properly.

In view of the importance of data processing, making copy, which is the first step in the process, plays an important role in providing raw information or materials for processing. However, there is no one simple solution which is provided to solve this problem.

SUMMARY OF THE PRESENT INVENTION

An object of the invention is to provide a method of reproducing an original document with a reproduction machine to produce a copied document in which a marking is added to the copied document consistently at a particular position.

Another advantage of the invention is to provide a method of reproducing an original document with a reproduction machine to produce a copied document which is capable of providing guidance adding a marking onto a copied document such that the marking being added to the copied document is consistently positioned at a particular position.

Additional advantages and features of the invention will become apparent from the description which follows, and may be realized by means of the instrumentalities and combinations particular point out in the appended claims.

According to the present invention, the foregoing and other objects and advantages are attained by a method of reproducing an original document with a reproduction machine to produce a copied document, wherein the reproduction machine includes a cover unit defining a cover surface having a top end portion, and a glass unit defining a glass surface having a top end portion, wherein the method comprises the steps of:

providing a marking member onto the top end portion of the cover unit of the reproduction machine such that the marking member is positioned on the top end portion of the glass surface of the glass unit when the cover unit is in a close position at which the cover unit covers the glass unit, thereby when an original document is placed onto the glass surface of the glass unit, the marking member is provided to the glass unit and is copied onto a copied document of the original document at a top end portion of the copied document.

In accordance with another aspect of the invention, the present invention is a method of reproducing an original document with a reproduction machine to produce a copied document which comprises the steps of:

(a) providing a marking member which contains a marking onto the reproduction machine;

(b) opening a cover unit of the reproduction machine;

(c) placing the original document on a glass surface of a glass unit of the reproduction machine;

(d) closing the cover unit so that the glass surface is covered by the cover unit; and (e) pressing a start button of a control panel of the reproduction machine to start a scanning process of the reproduction machine such that the original document and the marking of the marking member are scanned together in the scanning process.

Preferably, the step (a) of the method further comprises the sub-steps of:

(a.1) defining a scanning portion which is divided into a marking portion and a document portion of a cover surface of a cover unit of the reproduction machine; and (a.2) placing a marking member which contains a marking onto the marking portion of the cover surface of the cover unit of the reproduction machine.

Alternately, the step (a) of the method further comprises the sub-steps of:

(a.1') defining a scanning portion which is divided into a marking portion and a document portion of a glass surface of a glass unit of the reproduction machine; and (a.2') placing a marking member which contains a marking onto the marking portion of the glass surface of the glass unit of the reproduction machine.

The marking member is white or transparent in color and only the marking will be scanned onto the copied document.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
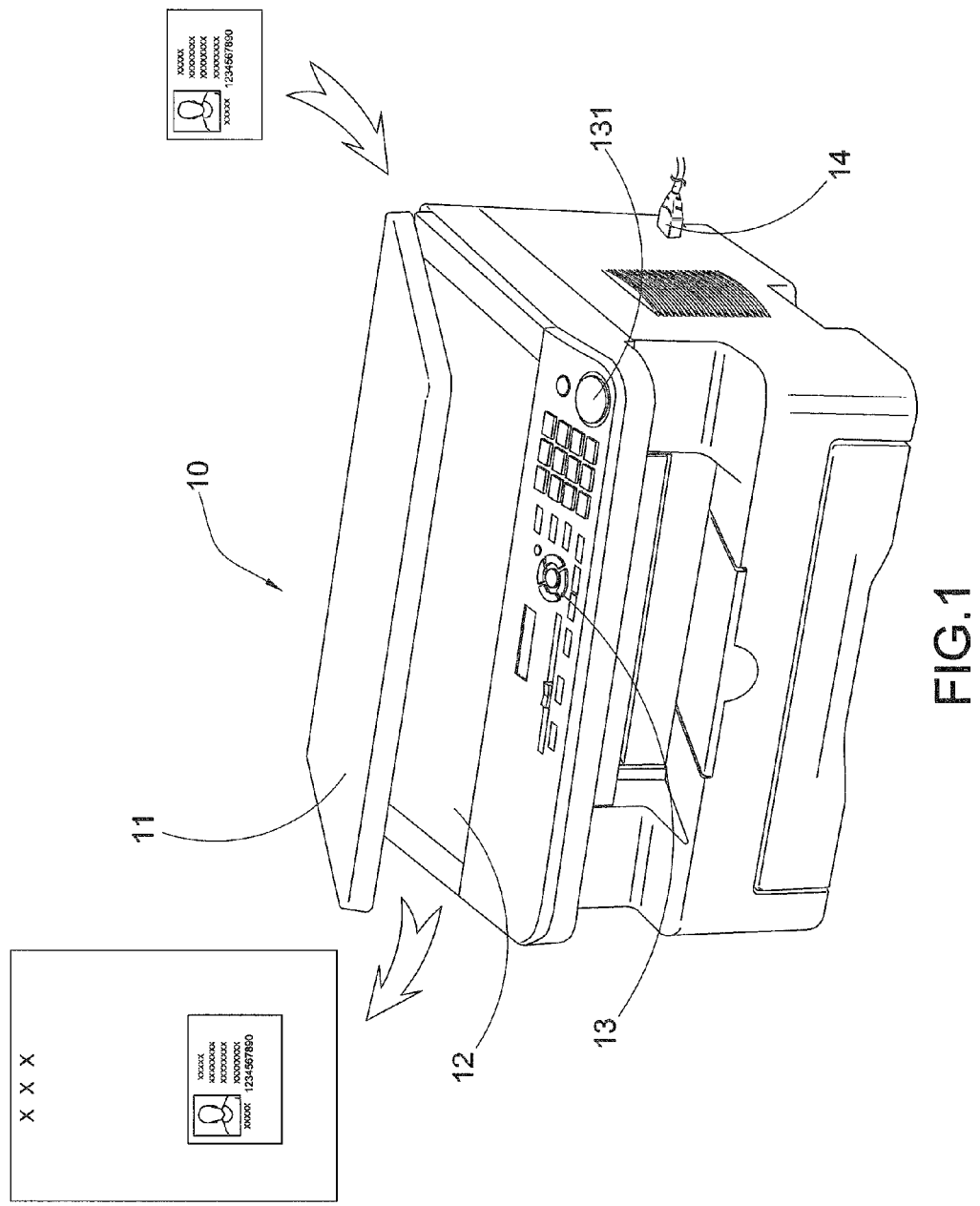
FIG. 1 is an illustration of a reproduction machine according to a preferred embodiment of the present invention.

Referring to FIGS. 1 to 4 of the drawings, a method of reproducing an original document with a reproduction machine to produce a copied document is illustrated. The reproduction machine 10 can be a copier, a scanner or an all-in-one machine having functions for both copying and scanning. The reproduction machine 10 includes a glass unit 12 having a glass surface 121 arranged for placing an original document on top of the glass surface 121; a cover unit 11 having a cover surface 111 arranged for covering the glass surface 121 when a scanning process is operated by the reproduction machine 10; a power source 14 and a control panel 13 which includes a start button 131 for actuating the scanning process of the reproduction machine 10.

The original document can be a paper, a copy by itself needed to be copied, a passport, an identification document such as a driver license or an identification card. The original document refers to a document which is placed on top of the glass unit for making copying or scanning. The resulting document from copying or scanning is a copied document, which may be a paper copy or a scan copy.

Figure 4:
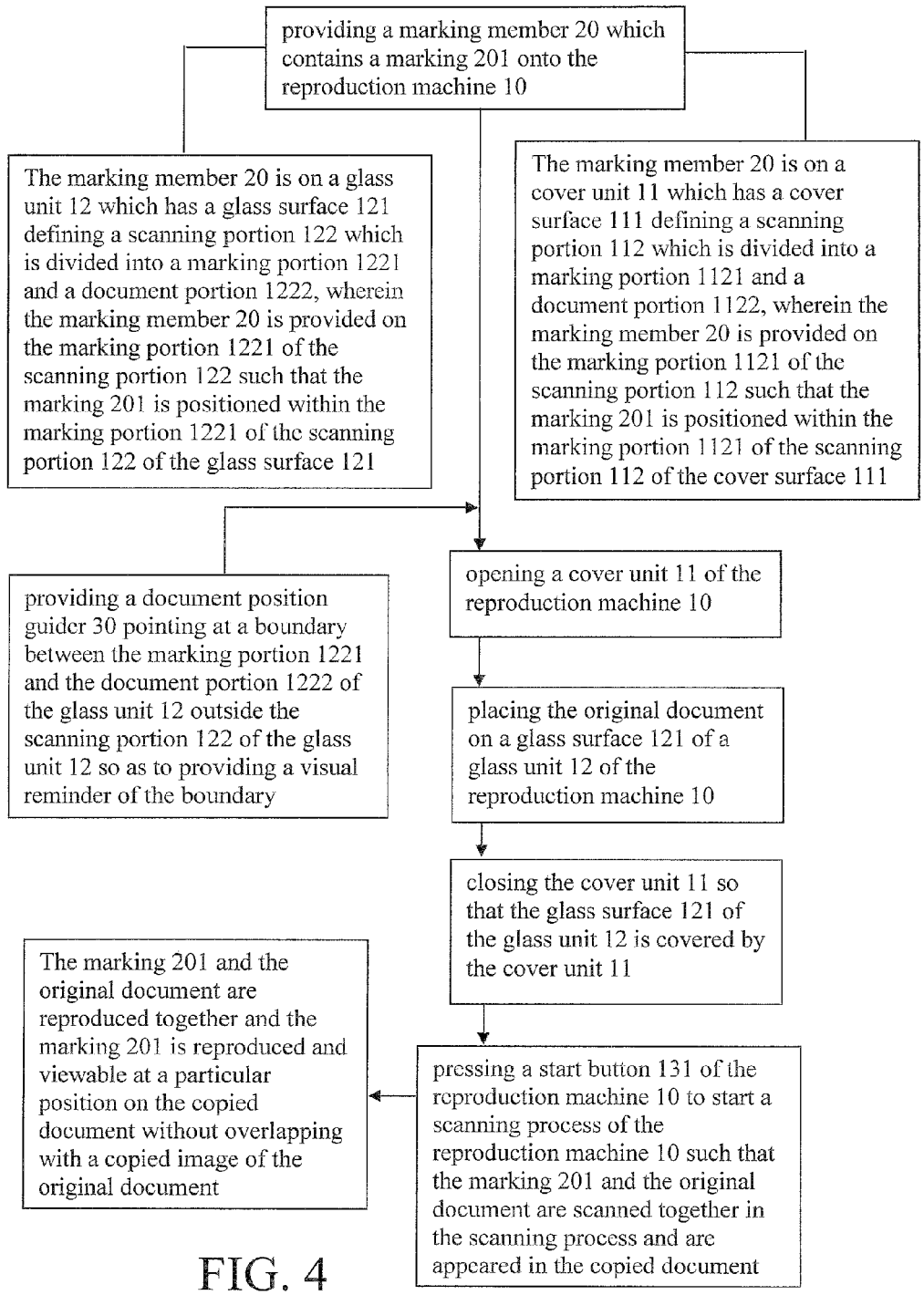
FIG. 4 is a flow diagram showing a method of reproducing an original document with a reproduction machine to produce a copied document according to the above preferred embodiment of the present invention.

Referring to FIG. 4 of the drawings, a method of reproducing an original document with a reproduction machine to produce a copied document according to the preferred embodiment of the present invention comprises the steps of:

(a) providing a marking member 20 which contains a marking 201 onto the reproduction machine 10;

(b) opening a cover unit 11 of the reproduction machine 10;

(c) placing the original document on a glass surface 121 of a glass unit of the reproduction machine 10;

(d) closing the cover unit 11 so that the glass surface 121 is covered by the cover unit 11; and (e) pressing a start button 131 of a control panel 13 of the reproduction machine 10 to start a scanning process of the reproduction machine 10 such that the original document and the marking of the marking member 20 are scanned together in the scanning process.

Accordingly, the copied document will contain images of the original document and the marking.

Figure 2A:
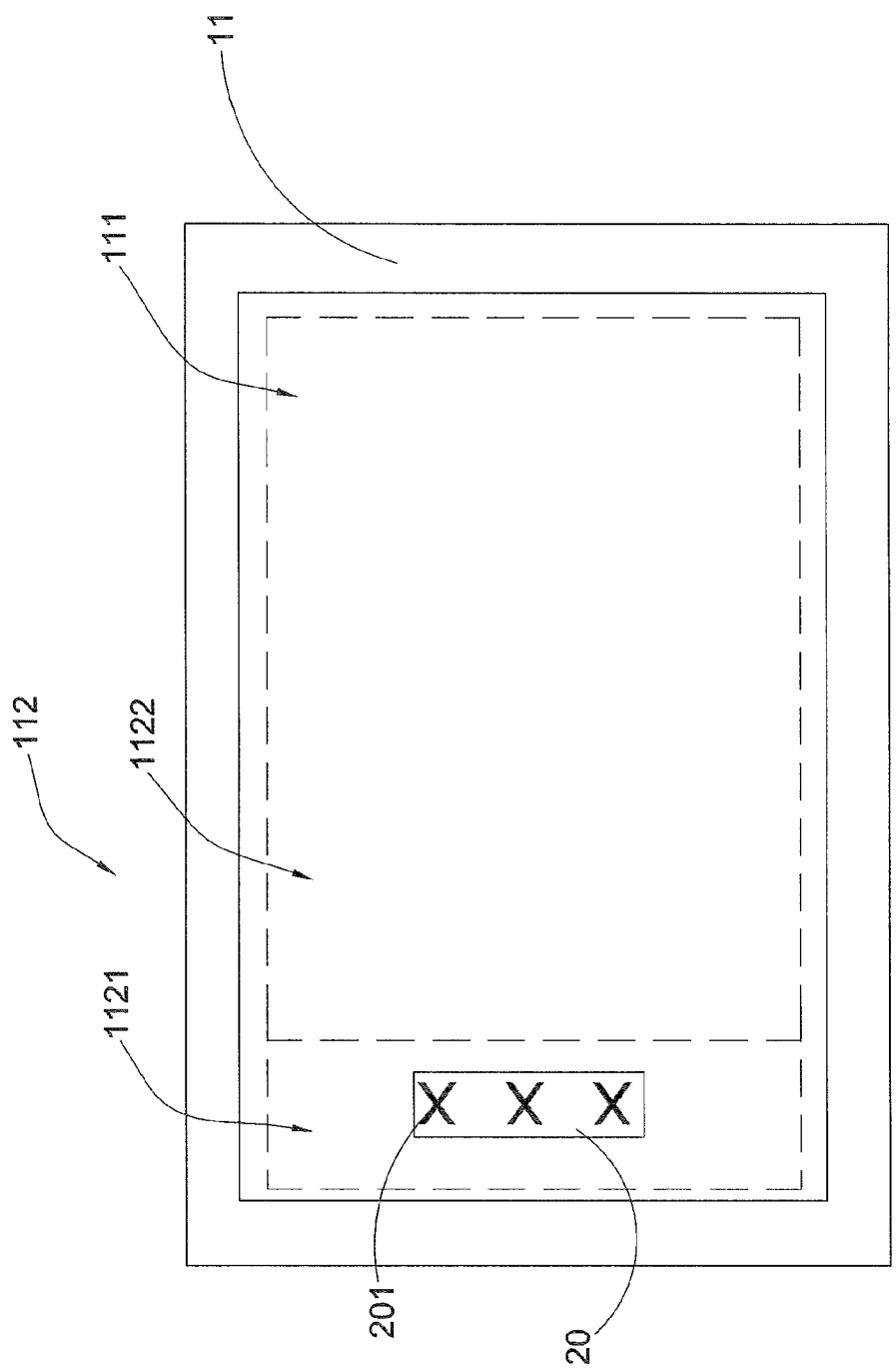
FIG. 2A is illustration of a cover unit of the reproduction machine according to the above preferred embodiment of the present invention.
Figure 2B:
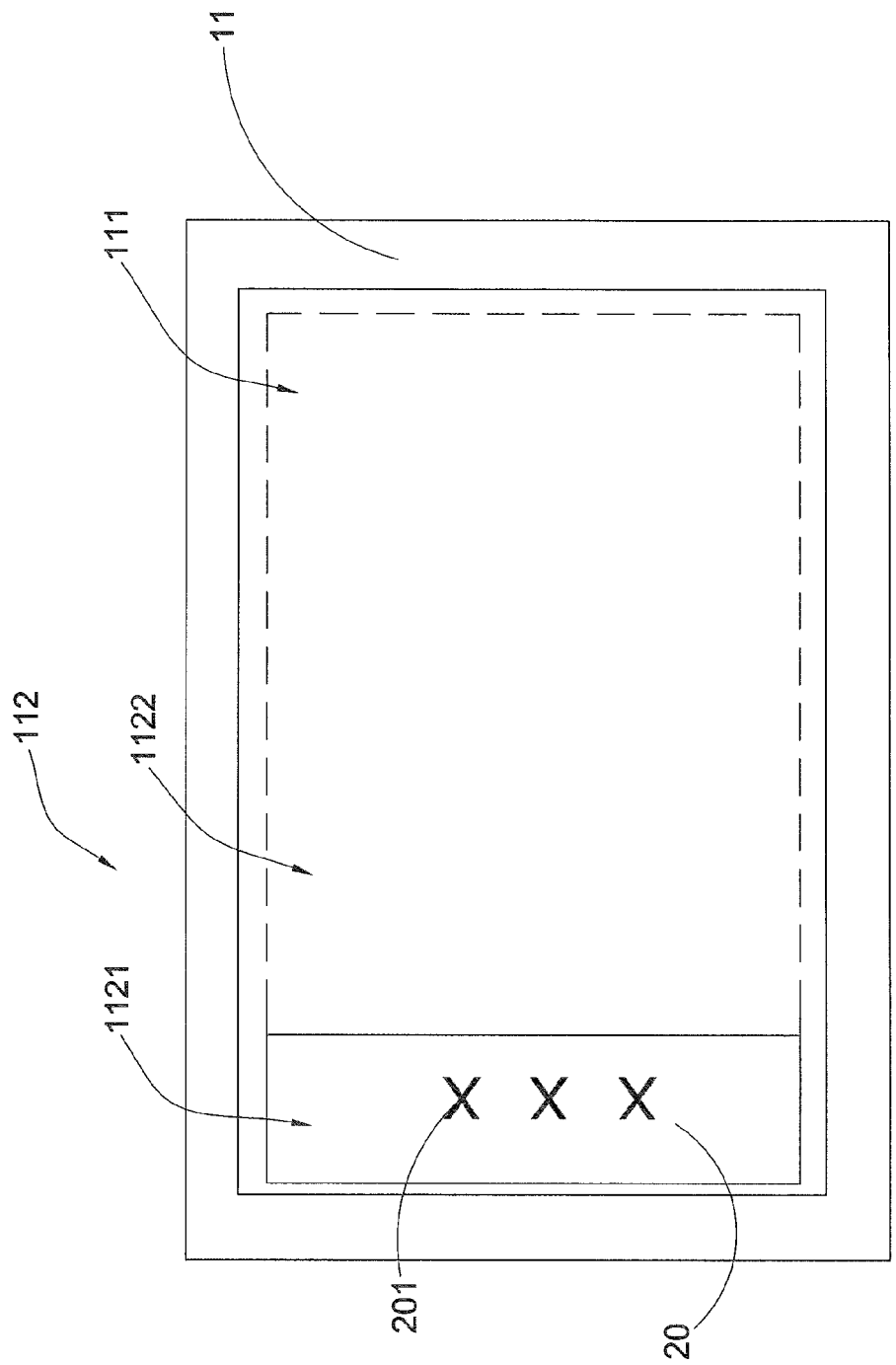
FIG. 2B is another illustration of a cover unit of the reproduction machine according to the above preferred embodiment of the present invention.

Preferably, referring to FIGS. 2A and 2B of the drawings, the marking member 20 is provided on the cover surface 111 of the cover unit 11. In particular, the cover surface 111 has a scanning portion 112 corresponding to a size of the copied document which is further divided into a marking portion 1121 at a top end portion of the scanning portion 112 and a document portion 1122 arranged for covering the original document. As shown in FIG. 2A of the drawings, the marking member 20 has a size which is fitted to adhere to the marking portion 1121 such that the marking 201 of the marking member 20 will be fixed to copy onto a top end portion of the copied document. Alternately, as shown in FIG. 2B of the drawings, the marking member 20 has a size which is fitted to adhere to the scanning portion 112 and the marking 201 is positioned at the marking portion 1121 at the top end portion of the scanning portion 112. The marking member 20 is white or transparent in color and will not interfere with the marking or the original document to be copied.

In other words, since the marking 201 is provided at a particular position of the cover unit 11, which is the marking portion 1121 of the scanning portion 112 of the cover unit 11, the marking 201 as appeared in the copied document will be standardized at a particular position. Therefore the problem of manual operation of placing the marking with the original document is solved. The marking will not be omitted or misplaced to an undesirable position due to human error.

Accordingly, the step (a) of the method further comprises the sub-steps of:

(a.1) defining a scanning portion 112 which is divided into a marking portion 1121 and a document portion 1122 of a cover surface 111 of a cover unit 11 of the reproduction machine 10; and (a.2) placing a marking member 20 which contains a marking 201 onto the marking portion 1121 of the cover surface 111 of the cover unit 11 of the reproduction machine 10.

Figure 3A:
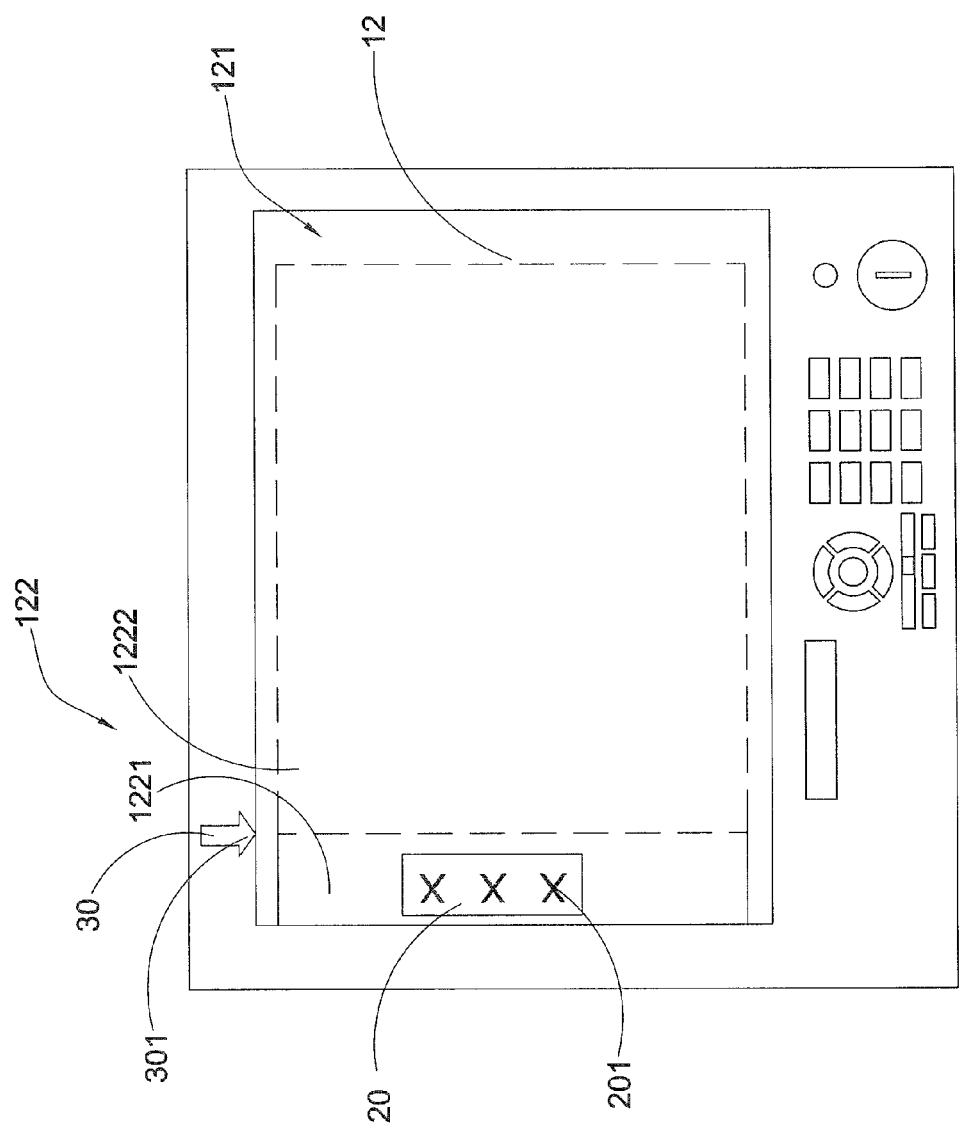
FIG. 3A is illustration of a glass unit of the reproduction machine according to the above preferred embodiment of the present invention.
Figure 3B:
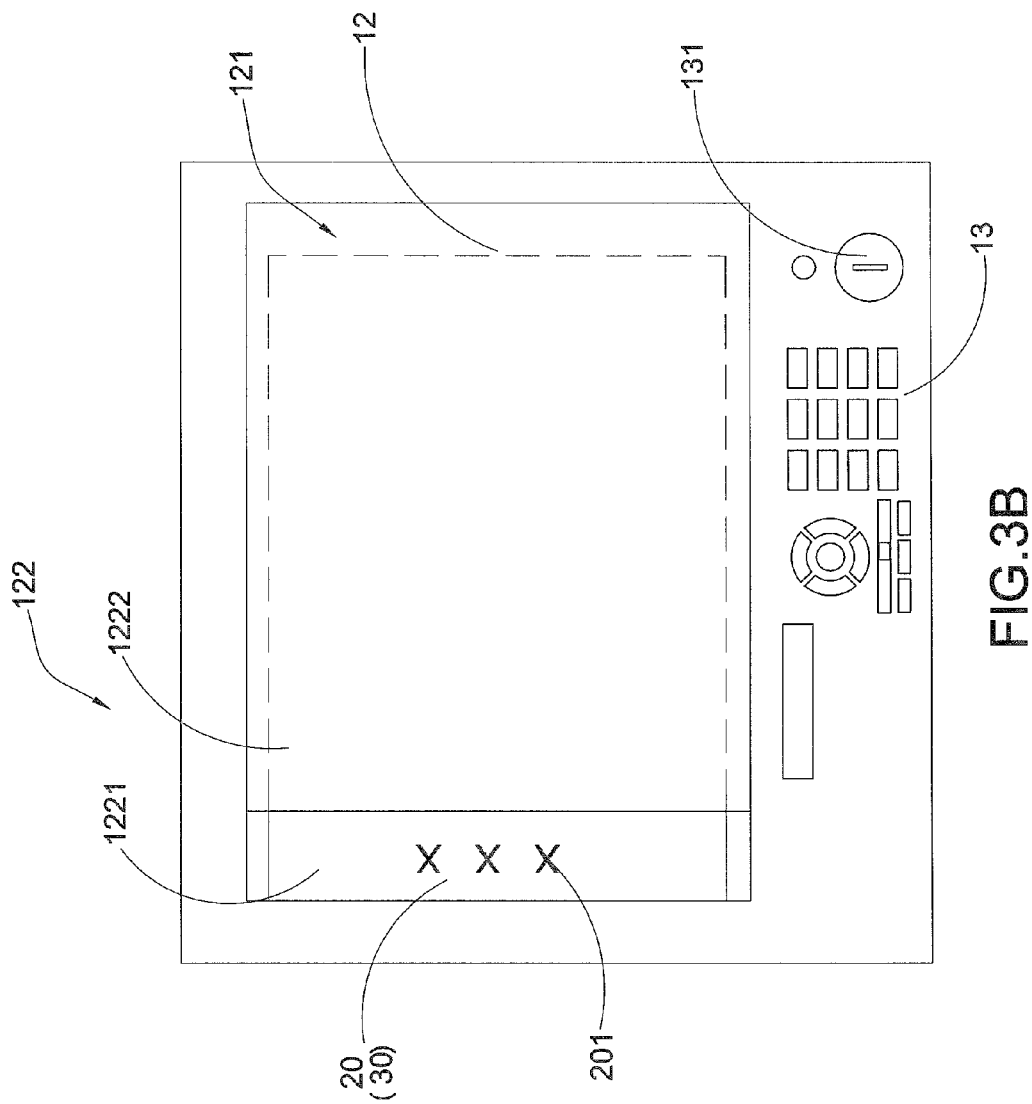
FIG. 3B is another illustration of a glass unit of the reproduction machine according to the above preferred embodiment of the present invention.

Alternately, referring to FIGS. 3A and 3B of the drawings, the marking member 20 is provided on the glass surface 121 of the glass unit 12. In particular, the glass surface 121 has a scanning portion 122 corresponding to a size of the copied document which is further divided into a marking portion 1221 at a top end portion of the scanning portion 122 and a document portion 1222 arranged for placing the original document. The marking member 20 has a size which is fitted to adhere to the marking portion 1221 such that the marking 201 of the marking member 20 will be fixed at a position to copy onto a top end portion of the copied document. The marking member 20 is white or transparent in color and will not interfere with the marking or the original document to be copied.

Accordingly, the step (a) of the method further comprises the sub-steps of:

(a.1') defining a scanning portion 122 which is divided into a marking portion 1221 and a document portion 1222 of a glass surface 121 of a glass unit 12 of the reproduction machine 10; and (a.2') placing a marking member 20 which contains a marking 201 onto the marking portion 1221 of the glass surface 121 of the glass unit 12 of the reproduction machine 10.

As shown in FIG. 3A of the drawings, a document position guider 30 is further provided onto the glass unit 12. In particular, the document position guider 30 is embodied as an arrow 301 pointing to the boundary between the marking portion 1221 and the document portion 1222 so as to providing a visual reminder of the boundary of the marking portion 1221 of the scanning portion 122 of the glass unit 12.

Alternately, as shown in FIG. 3B of the drawings, the marking member 20 has a size which is fitted to adhere to the entire portion of the marking portion 1221 of the scanning portion 122 so that the marking member 20 is served as a document position guider 30 for providing a visual reminder of the boundary of the marking portion 1221 of the scanning portion 122 of the glass unit 12.

Accordingly, since the marking 201 is affixed to a particular position, the marking 201 can be provided to a desired position designated by the management. In other words, based on the filing or binding practice of an office, the management can avoid the hole-punching position or the binding position and standardize the marking on a particular desired position. In other words, problem of non-standardized position of the marking or omission of marking in the copied document can be solved effectively.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of reproducing an original document with a reproduction machine to produce a copied document, wherein the reproduction machine includes a power source, a control panel, a glass unit having a glass surface and a cover unit having a cover surface, wherein the method comprises the steps of:
   (a) providing a marking member which contains a marking onto a preset position of the reproduction machine such that the marking and the original document are reproduced together and the marking is reproduced and viewable at a particular position on the copied document without overlapping with a copied image of the original document.

2. The method, as recited in claim 1, wherein in the step (a), further comprises the steps of:
   (i) defining a scanning portion in the cover surface of the cover unit, wherein said scanning portion is divided into a marking portion and a document portion; and
   (ii) adhering the marking member which is sized to fit onto said marking portion to position onto said marking portion of said scanning portion of the cover surface of the cover unit.

3. The method, as recited in claim 1, wherein in the step (a), further comprises the steps of:
   (i) defining a scanning portion in the cover surface of the cover unit, wherein said scanning portion is divided into a marking portion and a document portion; and
   (ii) adhering the marking member which is sized to fit onto said scanning portion to position onto said entire scanning portion of the cover surface of the cover unit in such a manner that said marking of said marking member is positioned at said marking position.

4. The method, as recited in claim 1, wherein in the step (a), further comprises the steps of:
   (i) defining a scanning portion in the glass surface of the glass unit, wherein said scanning portion is divided into a marking portion and a document portion; and
   (ii) adhering the marking member which is sized to fit onto said marking portion to position onto said marking portion of said scanning portion of the glass surface of the cover unit.

5. The method, as recited in claim 4, wherein said marking member is sized to fit said entire marking portion such that a boundary between said marking portion and said document portion is visible and prominent and said marking member is served as a document position guider for showing the boundary between said marking portion and said document portion.

6. The method, as recited in claim 4, further comprising the step of:

(b) providing a document position guider pointing at a boundary between said marking portion and said document portion of said glass unit outside said scanning portion of said glass unit so as to providing a visual reminder of the boundary between said marking portion and said document portion of said glass unit.

7. The method, as recited in claim 2, wherein said marking member is white in color or transparent while said marking is black in color such that said marking member is invisible in the copied document and said marking is clear in black color in the copied document.

8. The method, as recited in claim 3, wherein said marking member is white in color or transparent while said marking is black in color such that said marking member is invisible in the copied document and said marking is clear in black color in the copied document.

9. The method, as recited in claim 4, wherein said marking member is white in color or transparent while said marking is black in color such that said marking member is invisible in the copied document and said marking is clear in black color in the copied document.

10. The method, as recited in claim 6, wherein said marking member is white in color or transparent while said marking is black in color such that said marking member is invisible in the copied document and said marking is clear in black color in the copied document.

11. The method, as recited in claim 8, wherein said marking is a text of XXX.

12. The method, as recited in claim 10, wherein said marking is a text of XXX.

13. The method, as recited in claim 8, wherein the copied document is a paper copy or an electronic scan copy.

14. The method, as recited in claim 10, wherein the copied document is a paper copy or an electronic scan copy.

15. A method of reproducing an original document with a reproduction machine to produce a copied document, comprising the steps of:
   (a') providing a marking member which contains a marking onto the reproduction machine;
   (b') opening a cover unit of the reproduction machine;
   (c') placing the original document on a glass surface of a glass unit of the reproduction machine;
   (d') closing the cover unit so that the glass surface of the glass unit is covered by the cover unit; and
   (e') pressing a start button of the reproduction machine to start a scanning process of the reproduction machine such that the marking and the original document are scanned together in the scanning process and are appeared in the copied document.

16. The method, as recited in claim 15, wherein the cover unit has a cover surface defining a scanning portion which is divided into a marking portion and a document portion of the scanning portion of the cover surface, wherein the marking member is provided on the marking portion of the scanning portion such that the marking is positioned within the marking portion of the scanning portion of the cover surface.

17. The method, as recited in claim 15, wherein the glass surface of the glass unit further defines a scanning portion which is divided into a marking portion and a document portion of the scanning portion of the glass surface, wherein the marking member is provided on the marking portion of the scanning portion such that the marking is positioned within the marking portion of the scanning portion of the glass surface.

18. The method, as recited in claim 16, wherein the marking member is white in color or transparent and the marking is black in color such that the marking member is invisible in the copied document and the marking is clear in black color in the copied document, wherein a size of the marking member is sized to fit the entire scanning portion of the cover surface while the marking is positioned in the marking portion of the scanning portion of the cover surface.

19. The method, as recited in claim 17, wherein the marking member is white in color or transparent and the marking is black in color such that the marking member is invisible in the copied document and the marking is clear in black color in the copied document, wherein a size of the marking member is sized to fit the entire marking portion of the scanning portion of the glass surface while the marking is positioned in the marking portion of the scanning portion of the glass surface such that the marking also serves as a document position guider at a boundary between the marking portion and the document portion of the glass unit outside the scanning portion of the glass unit so as to providing a visual reminder of the boundary between the marking portion and the document portion of the glass unit.

20. The method, as recited in claim 17, before step (b'), further comprising the step of: providing a document position guider pointing at a boundary between the marking portion and the document portion of the glass unit outside the scanning portion of the glass unit so as to providing a visual reminder of the boundary between the marking portion and the document portion of the glass unit.

\* \* \* \* \*